(12) United States Patent
Siomina

(10) Patent No.: US 9,756,602 B2
(45) Date of Patent: Sep. 5, 2017

(54) NODE AND METHOD FOR RADIO MEASUREMENT HANDLING

(71) Applicant: Telefonaktiebolaget L M Ericsson (publ), Stockholm (SE)

(72) Inventor: Iana Siomina, Täby (SE)

(73) Assignee: Telefonatkiebolaget LM Ericsson (publ), Stockholm (SE)

(*) Notice: Subject to any disclaimer, the term of this patent is extended or adjusted under 35 U.S.C. 154(b) by 62 days.

(21) Appl. No.: 14/435,967

(22) PCT Filed: Mar. 24, 2015

(86) PCT No.: PCT/SE2015/050350
§ 371 (c)(1),
(2) Date: Apr. 15, 2015

(87) PCT Pub. No.: WO2015/147735
PCT Pub. Date: Oct. 1, 2015

(65) Prior Publication Data
US 2016/0278040 A1 Sep. 22, 2016

Related U.S. Application Data

(60) Provisional application No. 61/970,980, filed on Mar. 27, 2014.

(51) Int. Cl.
*H04W 24/00* (2009.01)
*H04W 64/00* (2009.01)
(Continued)

(52) U.S. Cl.
CPC ......... *H04W 64/006* (2013.01); *H04W 4/023* (2013.01); *H04W 64/00* (2013.01); *H04W 72/048* (2013.01); *H04W 84/18* (2013.01)

(58) Field of Classification Search
CPC ..... H04W 24/10; H04W 24/08; H04W 24/02; H04W 48/16; H04W 36/0088
(Continued)

(56) References Cited

U.S. PATENT DOCUMENTS

| 2004/0258012 | A1* | 12/2004 | Ishii | H04L 47/10 370/328 |
| 2011/0159893 | A1* | 6/2011 | Siomina et al. | H04W 4/02 455/456.3 |
| 2014/0080489 | A1* | 3/2014 | Siomina | H04W 64/00 455/437 |

FOREIGN PATENT DOCUMENTS

EP 2704471 A2 3/2014

OTHER PUBLICATIONS

3GPP TS 29.171 V12.0.0 (Dec. 2013): 3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 12), hereinafter TS29.171.*

(Continued)

*Primary Examiner* — Ronald Eisner
(74) *Attorney, Agent, or Firm* — Murphy, Bilak & Homiller, PLLC

(57) ABSTRACT

Example embodiments presented herein are directed towards a first node, and corresponding methods therein, for obtaining an available radio measurement associated with a wireless device. Example embodiments presented herein are also directed towards a second node, and corresponding methods there, for providing an available radio measurement associated with the wireless device.

26 Claims, 8 Drawing Sheets

(51) Int. Cl.
*H04W 72/04* (2009.01)
*H04W 4/02* (2009.01)
*H04W 84/18* (2009.01)

(58) Field of Classification Search
USPC ............... 445/404.1, 404.2, 456.1–457;
340/539.13, 988–996; D10/104.2
See application file for complete search history.

(56) References Cited

OTHER PUBLICATIONS

3GPP TS 22.071 V11.0.0 (Sep. 2012) 3rd Generation Partnership Project; Technical Specification Group Services and System Aspects; Location Services (LCS); Service description; Stage 1 (Release 11), hereinafter TS22.071.*

3GPP, "3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 12)", 3GPP TS 29.171 V12.0.0, Dec. 2013, 1-51.

3GPP, "3rd Generation Partnership Project; Technical Specification Group Services and System Aspects; Location Services (LCS); Service description; Stage 1 (Release 12)", 3GPP TS 22.071 V12.0.0, Oct. 2014, 1-52.

3GPP, "3rd Generation Partnership Project; Technical Specification Group Services and System Aspects; Universal Geographical Area Description (GAD) (Release 12)", 3GPP TS 23.032 V12.0.0, Sep. 2014, 1-29.

\* cited by examiner

NODE AND METHOD FOR RADIO MEASUREMENT HANDLING

TECHNICAL FIELD

Example embodiments presented herein are directed towards a first node, and corresponding methods therein, for obtaining an available radio measurement associated with a wireless device. Example embodiments presented herein are also directed towards a second node, and corresponding methods there, for providing an available radio measurement associated with the wireless device.

BACKGROUND

LTE Positioning Overview

Several positioning methods for determining the location of the target device, which can be any of the wireless device or user equipment (UE), mobile relay, Personal Data Assistant (PDA), wireless device for machine type communication or machine to machine communication, laptop mounting wireless devices or equipment, etc., exist. The position of the target device is determined by using one or more positioning measurements, which may be performed by a suitable measuring node or the target device. Depending upon the positioning method used the measuring node may either be the target device itself, a separate radio node, for example, a standalone node, serving and/or neighboring nodes of the target device, etc. Also depending upon the positioning method the measurements can be performed by one or more types of measuring nodes.

The Long Term Evolution (LTE) architecture explicitly supports location services by defining the Evolved Serving Mobile Location Center (E-SMLC) that is connected to the core network, for example, a Mobility Management Entity (MME), via the so called Location Services-Application Protocol (LCS-AP) interface and the Gateway Mobile Location Center (GMLC) that is connected to the MME via the standardized Lg interface. The LTE system supports a range of methods to locate the position of the target devices, for example, a user equipment, within the coverage area of the Radio Access Network (RAN). These methods differ in accuracy and availability. Typically, satellite based methods, for example, Assisted Global Navigation Satellite System (A-GNSS), are accurate with a few meter(s) of resolution, but may not be available in indoor environments. On the other hand, Cell identification (ID) based methods are much less accurate, but have high availability. Therefore, LTE uses Assisted Global Positioning System (A-GPS) as the primary method for positioning, while Cell-ID and Observed Time Difference of Arrival (OTDOA) based schemes serve as fallback methods.

In LTE the positioning node, for example, an Evolved Serving Mobile Location Center (E-SMLC) or a location server, configures the target device, for example, a UE, eNode B or a radio node dedicated for positioning measurements, for example, a Location Measurement Unit, to perform one or more positioning measurements depending upon the positioning method. The positioning measurements are used by the target device or by a measuring node or by the positioning node to determine the location of the target device. In LTE the positioning node communicates with UE using LTE Positioning Protocol (LPP) and with eNode B using LTE Positioning Protocol Annex (LPPa).

An example LTE positioning architecture is shown in FIG. 1. The three key network elements in an LTE positioning architecture are the Location Services (LCS) Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, for example, the entities being positioned. LCS Clients may also reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or a network node or external client.

Positioning measurements may be performed on Downlink (DL) radio signals, for example, Cell specific Reference Signals (CRS) or Positioning Reference Signals (PRS), or signals transmitted by a radio network node, Uplink (UL) radio signals, for example, Sounding Reference Signals (SRS), or signals transmitted by a wireless device to a network or another wireless device, or satellite radio signals. The measurements may also bidirectional, for example, Round Trip Time (RTT) or UE Receive-Transmit (Rx-Tx), which are performed on DL and UL signals. The measurements may be intra-frequency, inter-frequency, or inter-Radio Access Type (RAT). Positioning measurements are performed by a measuring node, which may be a wireless device, a radio base station, or other radio nodes, for example, Location Measurement Units (LMUs).

Position calculation can be conducted, for example, by a positioning server, for example, E-SMLC or Secure User Plane Location Platform (SLP) in LTE, or a UE. The former approach corresponds to the UE-assisted positioning mode when it is based on UE measurements, whilst the latter corresponds to the UE-based positioning mode.

Positioning Methods

A network typically deploys a range of complementing methods characterized by different performance in different environments. Depending on where the measurements are conducted and the final position is calculated, the methods can be UE-based, UE-assisted or network-based, each with own advantages. The following methods are available in the LTE standard for both the control plane and the user plane:

Cell ID (CID),
UE-assisted and network-based E-CID, including network-based Angle of Arrival (AoA),
UE-based and UE-assisted A-GNSS (including A-GPS),
UE-assisted Observed Time Difference of Arrival (OTDOA),
Network-based Uplink Time Difference of Arrival (UTDOA).

CID: Given the cell ID of the serving cell, the UE position is associated with the cell coverage area which can be described, for example, by a pre-stored polygon.

E-CID: Enhanced CID (E-CID) methods exploit four sources of position information: the CID and the corresponding geographical description of the serving cell, the round trip time (RTT) with respect to the serving cell measured, for example, by means of Timing Advance (TA) and/or receive-transmit time difference measured at either UE and BS side. The CIDs and the corresponding signal measurements of the cells, up to 32 cells in LTE, including the serving cell, as well as AoA measurements. The three most common E-CID techniques include: CID+RTT, CID+signal strength and AoA+RTT.

Fingerprinting, Radio Frequency Pattern Matching (RFPM), and Adaptive Enhanced Cell ID (AECID): These positioning methods obtain radio measurements and match them with reference measurements that are associated with a certain location and hereby determine the UE location. The measurements for these methods in LTE may be collected by means of E-CID.

Time Difference of Arrival (TDOA)-/Time of Arrival (TOA)-based methods: Some examples are OTDOA, UTDOA or GNSS/A-GNSS.

Hybrid methods: These methods are based on a combination of any two or more positioning methods or measurement types.

Other systems, for example, Universal Mobile Telecommunications System (UMTS), Global System for Mobile Communication (GSM) or Code Division Multiple Access 2000 (CDMA2000), typically also support a range of positioning methods and many of them are similar to the described above.

Positioning Quality

Positioning quality is determined by

Positioning measurement quality, this is ensured by the minimum measurement requirements, for example, minimum measurement accuracy, maximum measurement and reporting time, etc., so that measurements of a certain quality are then used for UE location calculation.

Positioning result QoS is the quality of the result of the UE location calculation.

Positioning measurement quality and positioning result QoS are further discussed below. Each of them may be the actual quality or the target quality.

Positioning Measurement Quality

There exists, for example, UE Reference Signal Time Difference (RSTD) measurement requirements on the maximum time elapsed from receiving a measurement request from the network, during which the UE has to perform new measurements and report these measurements to the network. There are also UE RSTD measurement accuracy requirements. Similar requirements have been defined for UE Rx-Tx time difference measurements.

Positioning Result Quality of Service (QoS)

Positioning QoS, for example, LCS QoS or target QoS for positioning, is described by horizontal uncertainty, vertical uncertainty, and response time. The uncertainty information, either horizontal or vertical, typically comprises an accuracy level and the corresponding confidence level.

The LCS QoS depends on the service requesting positioning. There may also be pre-defined QoS configurations for specific LCS Client Types and/or LCS Service Types. The LCS QoS may be signaled by LCS Client to other nodes. In LTE, E-SMLC may receive this information from MME which in turn may receive it from the Gateway Mobile Location Center (GMLC).

Actual Positioning Result QoS

The actual positioning result QoS may optionally be signaled together with the positioning result by E-SMLC, which calculates the positioning result, to the LCS Client which requested positioning.

Target LCS QoS Signaled to UE

The LCS QoS is communicated to UE performing positioning measurements. More specifically, in the existing LTE specifications, it is signaled from E-SMLC to UE over the LTE Positioning Protocol (LPP) in the commonIEsRequestLocationInformation element. All QoS requirements shall be obtained by the target device to the degree possible but it is permitted to return a response that does not fulfill all QoS requirements if some were not attainable. The single exception is response-time which shall always be fulfilled—even if that means not fulfilling other QoS requirements.

Below is how LCS positioning QoS is defined in LLP:

```
RequestLocationInformation-r9-IEs ::= SEQUENCE {
        commonIEsRequestLocationInformation
              CommonIEsRequestLocationInformation
        OPTIONAL, -- Need ON
        a-gnss-RequestLocationInformation      A-GNSS-RequestLocationInformation
        OPTIONAL, -- Need ON
        otdoa-RequestLocationInformation       OTDOA-RequestLocationInformation
        OPTIONAL, -- Need ON
        ecid-RequestLocationInformation        ECID-
RequestLocationInformation                     OPTIONAL, -- Need ON
        epdu-RequestLocationInformation        EPDU-Sequence     OPTIONAL,
        -- Need ON
        ...
}
QoS ::= SEQUENCE {
        horizontalAccuracy                     HorizontalAccuracy
        OPTIONAL, -- Need ON
        verticalCoordinateRequestBOOLEAN,
        verticalAccuracy                       VerticalAccuracy
        OPTIONAL, -- Need ON
        responseTime
        ResponseTime                           OPTIONAL, -- Need ON
        velocityRequest                              BOOLEAN,
        ...
}
HorizontalAccuracy ::= SEQUENCE {
        accuracy             INTEGER(0..127),
        confidence           INTEGER(0..100),
        ...
}
VerticalAccuracy ::= SEQUENCE {
        accuracy             INTEGER(0..127),
        confidence           INTEGER(0..100),
        ...
}
```

```
ResponseTime ::= SEQUENCE {
       time                    INTEGER (1..128),
       ...
}
```

Target LCS QoS Signaled to Radio Network Node

Currently it is not possible to signal the LCS QoS to the eNodeB via the LTE Positioning Protocol annex (LPPa).

Target LCS QoS Signaled to Positioning Node

Positioning node, E-SMLC on control plane, receives the request in LCS-AP request message from MME. This message is sent by the MME to request a location estimate for a target UE and comprises sufficient information to enable location according to the target QoS using any positioning method supported. The message is also used to request LCS assistance data transfer to an UE 3GPP TS 29.171 V12.0.0 (2013-12).

| IE/Group Name | Presence | Range | IE type and reference | Semantics description | Criticality | Assigned Critiality |
|---|---|---|---|---|---|---|
| Message Type | M | | 7.4.2 | | YES | reject |
| Correlation ID | M | | 7.4.28 | | YES | reject |
| Location Type | M | | 7.4.3 | | YES | reject |
| E-UTRAN Cell Identifier | M | | E-CGI/7.4.4 | | YES | ignore |
| LCS Client Type | O | | 7.4.5 | | YES | reject |
| LCS Priority | O | | 7.4.6 | | YES | reject |
| LCS QoS | O | | 7.4.7 | | YES | reject |
| LCS Service Type ID | O | | 7.4.30 | | YES | ignore |
| UE Positioning Capability | O | | 7.4.8 | | YES | reject |
| Include Velocity | O | | 7.4.9 | | YES | reject |
| IMSI | O | | 7.4.10 | | YES | ignore |
| IMEI | O | | 7.4.11 | | YES | ignore |
| Multiple APDUs | | 0 ... 3 | | | | |
| >APDU | M | | 7.4.18 | | YES | reject |

NOTE:
The IMSI should be sent preferably if known. The IMEI may be sent if the IMSI is not known, or in addition to the IMSI for the purpose of allowing correlation between the two identities.

The LCS QoS parameter (in bold and underlined above) provides the LCS QoS in the LCS Request. QoS may include horizontal accuracy, vertical accuracy and allowed response time.

| IE/Group Name | Presence | Range | IE type and reference | Semantics description |
|---|---|---|---|---|
| Horizontal Accuracy | O | | INTEGER (0 ... 127) | bit 8 = 0 bits 7-1 = 7 bit Uncertainty Code defined in 3GPP TS 23.032 [6]. The horizontal location error should be less than the error indicated by the uncertainty code with 67% confidence. |
| Vertical Requested | O | | ENUMERATED (Vertical Coordinate Is Not Requested (0), Vertical Coordinate Is Requested (1)) | Default value if this IE is not present is: Vertical Coordinate Is Not Requested (0). |
| Vertical Accuracy | O | | INTEGER (0 ... 127) | bit 8 = 0 bits 7-1 = 7 bit Vertical Uncertainty Code defined in 3GPP TS 23.032 [6]. The vertical location error should be less than the error indicated by the uncertainty code with 67% confidence. If the vertical requested IE is not present or present with a value of 0, then this vertical accuracy will be ignored, if present. |
| Response Time | O | | ENUMERATED (Low Delay(0), Delay Tolerant (1), ... ) | For details, refer to 3GPP TS 22.071 [10]. |

SUMMARY

A first node, for example, a positioning node, may request a UE measurement from a second node, for example, another UE or eNodeB, which may or may not have available the requested measurement of a desired positioning quality, for example, the measurement might have been received a longer time ago than required which is even more crucial for fast-moving UEs. The requested measurement is to be used for positioning such as RFPM and it is therefore important that the UE measurement received by the first node from the second node correctly describes the UE location.

The difference from the example embodiments presented herein is that in the prior art the eNodeB would not report for the purpose of positioning a UE measurement performed before the measurement request or measurement configuration is received, unless it has received another measurement request or measurement configuration even earlier. That is, it is not possible to request for positioning purpose UE radio measurements that have been available and in particular when a measurement needs to satisfy a certain quality criteria.

Accordingly, some of the example embodiments are directed towards a method, in a first node, for obtaining an available radio measurement associated with a wireless device, the first node is comprised in a communications network. The method comprises sending, to a second node, a positioning request for the available radio measurement. The method also comprises receiving, from the second node, a communication comprising at least one of the available radio measurement or an indication that the available radio measurement is not available.

Some of the example embodiments are directed towards a first node for obtaining an available radio measurement associated with a wireless device. The first node is comprised in a communications network. The first node comprises a transmitter configured to send, to a second node, a positioning request for the available radio measurement. The first node further comprising a receiver configured to receive, from the second node, a communication comprising at least one of the available radio measurement or an indication that the available radio measurement is not available.

Some of the example embodiments are directed towards a method, in a second node, for providing an available radio measurement associated with a wireless device. The second node is comprised in a communications network. The method comprises receiving, from a first node, a request for the available radio measurement. The method also comprises determining if a radio measurement associated with the wireless device is available. The method further comprises sending, to the first node or a third node, a communication comprising at least one of the available radio measurement or an indication that the radio measurement is not available.

Some of the example embodiments are directed towards a second node for providing an available radio measurement associated with a wireless device. The second node is comprised in a communications network. The second node comprises a receiver configured to receive, from a first node, a request for the available radio measurement. The second node further comprises processing circuitry configured to determine if a radio measurement associated with the wireless device is available. The second node further comprises a transmitter configured to send, to the first node or a third node, a communication comprising at least one of the available radio measurement or an indication that the radio measurement is not available.

An example advantage of some of the example embodiments presented herein is the possibility to request and obtain the measurements that are available, without the need to configure the UE for the requested measurements. A further example advantage is improved positioning by using more measurements. Yet another example advantage is the exploitation of measurements for positioning that is already available to the network, without requesting the UE to perform new measurements. Another example advantage is a new procedure for requesting am measurement upon determining that the requested measurement is not available.

DEFINITIONS

A-GPS Assisted GPS
AECID Adaptive Enhanced Cell ID
AoA Angel of Arrival
AP Application Protocol
APDU Application Protocol Data Unit
BCH Broadcast Channel
BS Base Station
CA Carrier Aggregation
CDMA Code Division Multiple Access
CID Cell Identity
CoMP Coordinated Multiple Point Transmission and Reception
CPICH Common Pilot Channel
CRS Cell-specific Reference Signal
CSI Channel State Information
CSI-RS CSI reference signal
DAS Distributed Antenna System
DL Downlink
E-CID Enhanced cell ID
eICIC Enhanced Inter-Cell Interference Coordination
eNB eNodeB
E-SMLC evolved SMLC
GMLC Gateway Mobile Location Center
GNSS Global Navigation Satellite System
GPS Global Positioning System
GSM Global System for Mobile Communication
HSPA High Speed Packet Access
ICIC Inter-Cell Interference Coordination
ID Identity
IMEI International Mobile Equipment Identity
L1 Layer 1
L2 Layer 2
LCS Location Services
LBS Location Based Services
LMU Location Measurement Unit
LPP LTE Positioning Protocol
LPPa LTE Positioning Protocol annex
LTE Long Term Evolution
MAC Medium Access Control
MDT Minimization of Drive Test
MME Mobility Management Entity
MSR Multi-Standard Radio
O&M Operational and Maintenance
OCC Orthogonal Cover Code
OFDM Orthogonal Frequency Division Multiplexing
OSS Operational Support Systems
OTDOA Observed time difference of arrival
PDA Personal Digital Assistant
PGW Packet Data Network Gateway
PRS Positioning Reference Signals
PRACH Physical Random Access Channel PSAP Public Safety Answering Point
QoS Quality of Service
RAN Radio Access Network
RAT Radio Access Technology
RE Resource Element
RB Resource Block
RF Radio Frequency
RFPM RF Pattern Matching
RNC Radio Network Controller
RRH Remote Radio Head
RRM Radio Resource Management
RRU Remote Radio Unit
RSCP Received Signal Code Power
RSRQ Reference signal received quality
RSRP Reference signal received power
RSSI Received signal strength indicator
RSTD Reference Signal Time Difference
RTT Round Trip Time
Rx Receive/Receiver
SFN Single Frequency Network
SGW Serving Gateway
SLP SUPL Location Platform
SMLC Serving Mobile Location Center
SON Self Organizing Network
SRS Sounding Reference Signal
SUPL Secure User Plane Location
TDOA Time Difference of Arrival
TOA Time of Arrival
TP Transmission point
Tx Transmit/Transmitter
UE User Equipment
UL Uplink
UMTS Universal Mobile Telecommunications System
UTDOA Uplink Time Difference of Arrival
UTRA Universal Terrestrial Radio Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
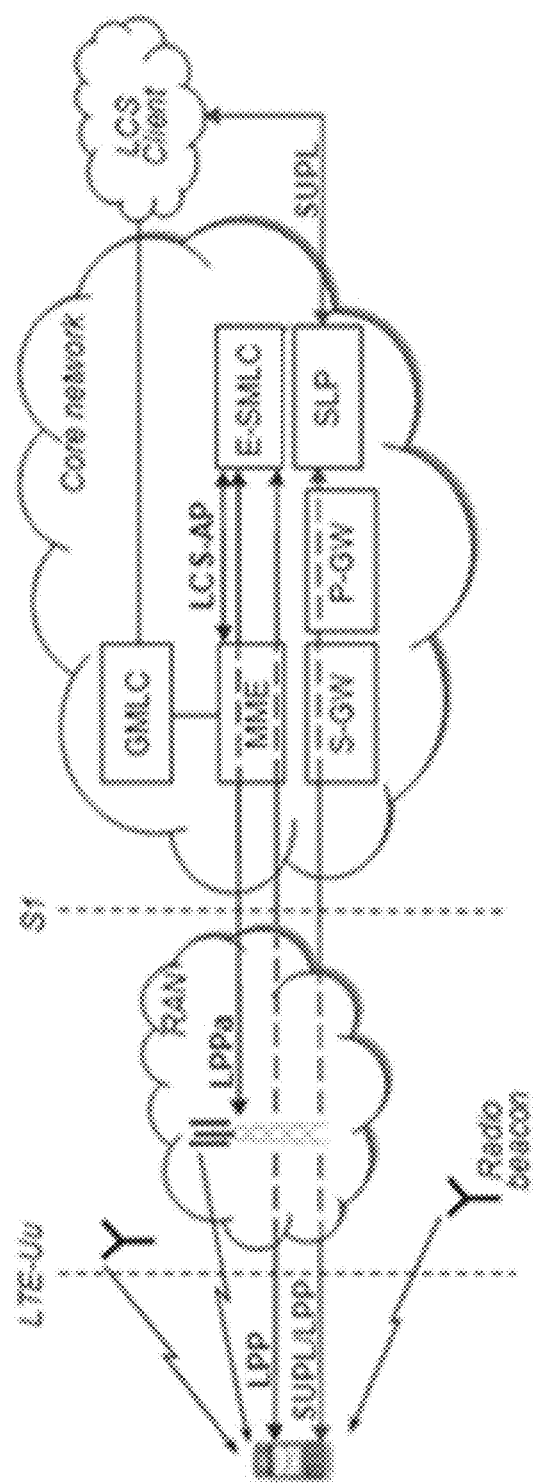
FIG. 1 is an illustration of positioning architecture in LTE.

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Terminology

A wireless device and UE are used interchangeably in the description. A UE may comprise any device equipped with a radio interface and capable of at least transmitting or receiving a radio signal from another radio node. A UE may also be capable of receiving signal and demodulate it. Note that even some radio network nodes, e.g., femto Base Station (BS), for example, a home BS, may also be equipped with a UE-like interface. Some example of "UE" that are to be understood in a general sense are PDA, laptop, mobile, a tablet device, sensor, fixed relay, mobile relay, any radio network node equipped with a UE-like interface, for example, a small Radio Base Station (RBS), eNodeB, femto BS.

A radio network node is a radio node comprised in a radio communications network. A radio network node may be capable of receiving radio signals or transmitting radio signals in one or more frequencies, and may operate in single-RAT, multi-RAT or multi-standard mode, for example, a Multi-Standard Radio (MSR). A radio network node, including eNodeB, a Remote Radio Head (RRH), a Remote Radio Unit (RRU), relay, a Location Measurement Unit (LMU), or transmitting-only/receiving-only radio network nodes, may or may not create own cell. Some examples of radio network nodes not creating own cell are beacon devices transmitting configured radio signals or measuring nodes receiving and performing measurements on certain signals, for example, LMUs. It may also share a cell or the used cell ID with another radio node which creates own cell, it may operate in a cell sector or may be associated with a radio network node creating own cell. More than one cell or cell sectors, commonly named in the described embodiments by a generalized term "cell" which may be understood as a cell or its logical or geographical part, may be associated with one radio network node. Further, one or more serving cells, in DL and/or UL, may be configured for a UE, for example, in a carrier aggregation system where a UE may have one Primary Cell (PCell) and one or more Secondary Cells (SCells). A cell may also be a virtual cell, for example, characterized by a cell ID but not provide a full cell-like service, associated with a transmit node.

A network node may be any radio network node, see the corresponding description, or a core network node. Some non-limiting examples of a network node are an eNodeB, also a radio network node, a Radio Network Controller (RNC), a positioning node, a Mobility Management Entity (MME), a Public Safety Answering Point (PSAP), a Self Organizing Network (SON) node, a Minimization of Drive Test (MDT) node, a coordinating node, a gateway node, for example, a Packet Data Network Gateway (PGW) or a Serving Gateway (SGW), a LMU gateway or a femto gateway, and an Operational and Maintenance (O&M) node.

The term "coordinating node" used herein is a network and/or node, which coordinates radio resources with one or more radio nodes. Some examples of the coordinating node are network monitoring and configuration node, an Operational Support Systems (OSS) node, an O&M, a MDT node, a SON node, positioning node, a MME, a gateway node such as a PGW or a SGW network node or femto gateway node, a macro node coordinating smaller radio nodes associated with it, eNodeB coordinating resources with other eNodeBs, etc.

The signaling/sending/receiving described in the example embodiments may be either physical-layer signaling or higher-layer, for example, Layer 2 or Layer 3, signaling, and it may be via direct links or logical links, for example, via higher layer protocols and/or via one or more network and/or radio nodes. For example, signaling from a coordinating node to a UE may also pass another network node, for example, a radio network node.

The described embodiments are not limited to LTE, but may apply with any Radio Access Network (RAN), single- or multi-Radio Access Type (RAT). Some other RAT examples are LTE-Advanced, Universal Mobile Telecommunications System (UMTS), High Speed Packet Access (HSPA), Global System for Mobile Communication (GSM), Code Division Multiple Access 2000 (cdma2000), Worldwide Interoperability for Microwave Access (WiMAX), and WiFi.

The terms 'UE measurement' and 'radio measurement' may be used interchangeably. These terms herein may refer to any radio measurement performed by the UE, which may be not necessarily originally performed for positioning purpose, for example, it may be performed for mobility, RRM, MDT, SON, interference coordination, or any other purpose. The measurement is performed on physical radio signals or channels. Some examples of radio signals are DL signals, for example, Cell-specific Reference Signal (CRS) or Positioning Reference Signals (PRS) in LTE, Common Pilot Channel (CPICH) in Universal Terrestrial Radio Access (UTRA), Broadcast Channel (BCH) in Global System for Mobile Communication (GSM), pilot signals, UL signals, for example, Sounding Reference Signal (SRS), Physical Random Access Channel (PRACH) in LTE, or radio signals between two UEs, for example, radio signal in device-to-device discovery or communication.

Some examples of measurements are received signal strength or quality, for example, Reference Signal Received Power (RSRP) and Reference Signal Received Quality (RSRQ) in LTE, and CPICH Received Signal Code Power (RSCP) in UTRA. Further examples are interference measurements, for example, Received Signal Strength Indicator (RSSI) in LTE or carrier RSSI in GSM. Further examples are timing measurements, for example, RTT, TOA, TDOA, Reference Signal Time Difference (RSTD), and UE Rx-Tx. The measurement may also involve measuring an uplink radio signal, for example, as with two-directional measurements such as UE Rx-Tx, eNB Rx-Tx, RTT, etc. In yet another example, the measurement may also involve measuring a second radio signal in the same direction, for example, on a second downlink, for example, a RSTD measurement which is a time difference of two signals over two downlinks. The measurement may be intra-frequency measurement, inter-frequency measurement, carrier aggregation (CA) measurement, or inter-RAT measurement, for example, UTRA or GSM measurement measured by the UE served in LTE. The embodiments described herein may apply to any measurement as defined above.

In the description, notation 'first node', 'second node', and 'third node' is used. Below there are some example embodiments supporting this terminology.

Some example embodiments describing the first node:
the first node is a network node,
the first node is eNodeB, RNC, or other radio network node,
the first node is a node with LCS Client,
the first node is a positioning node.
Some example embodiments describing the second node:
the second node is a radio network node capable of receiving UE measurements (e.g., eNodeB, RNC, etc.),
the second node is a UE,
the second node is a node which is different from the node performing the received measurement, for example, step 1 as described under the next subheading.
Some example embodiments describing the third node
the third node is a network node,
the third node is eNodeB, RNC, or other radio network node,
the third node is a node with LCS Client,
the third node is a positioning node.
Some example embodiments describing the relation between the first/second/third nodes:
At least two of the first, second, and third nodes are the same.
The first and the third nodes are different.
The first and the second nodes are logical nodes comprised in the same physical node and are communicating via an interface.
At least two of the first, second, and the third nodes are comprised in different RATs.

Overview of Example Embodiments

A first node, for example, a positioning node, may request a UE measurement from a second node, for example, another UE or eNodeB, which may or may not have available the requested measurement of a desired positioning quality, for example, the measurement might have been received a longer time ago than required which is even more crucial for fast-moving UEs. The requested measurement is to be used for positioning such as RFPM and it is therefore important that the UE measurement received by the first node from the second node correctly describes the UE location.

The difference from the example embodiments presented herein is that in the prior art the eNodeB would not report for the purpose of positioning a UE measurement performed before the measurement request or measurement configuration is received, unless it has received another measurement request or measurement configuration even earlier. That is, it is not possible to request for positioning purpose UE radio measurements that have been available and in particular when a measurement needs to satisfy a certain quality criteria.

Figure 2:
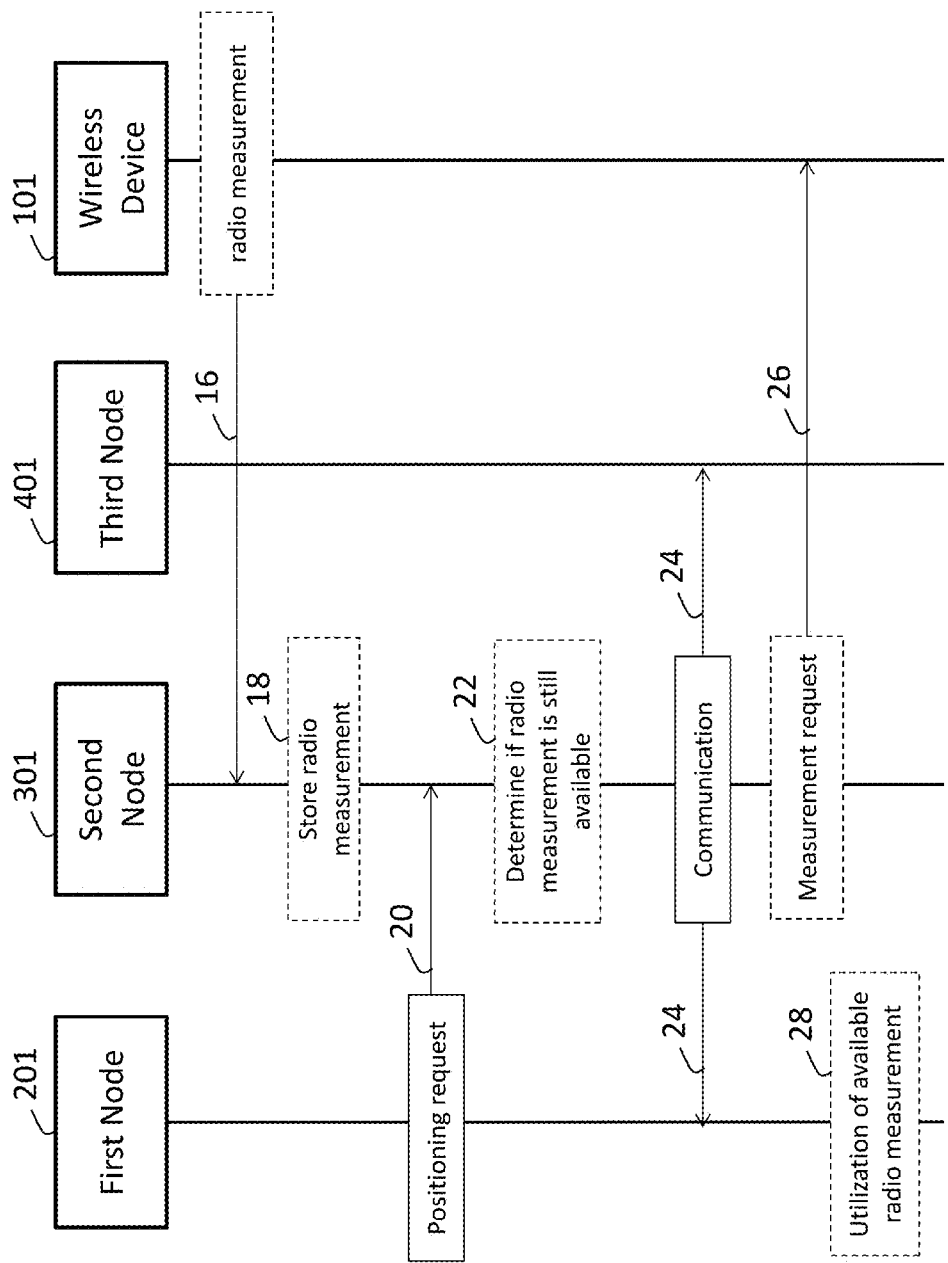
FIG. 2 is a message sequence diagram, according to some of the example embodiments presented herein

FIG. 2 illustrates an example message sequence depicting some of the example embodiments presented herein in providing available radio measurement handling. It should be appreciated that FIG. 2 comprises some messages/operations which are illustrated with a darker border and some operations which are illustrated with a dashed border. The messages/operations which are comprised in a darker border are messages/operations which are comprised in the broadest example embodiment. The operations which are comprised in a dashed border are example embodiments which may be comprised in, or a part of, or are further messages/operations which may be provided or performed in addition to the broader example embodiments. It should be appreciated that these messages/operations need not be provided or performed in order. Furthermore, it should be appreciated that not all of the messages/operations need to be provided or performed. The example messages/operations may be provided performed in any order and in any combination. It should be appreciated that the example messages/operations of FIG. 4 may be provided or performed simultaneously for any number of nodes in communications network as discussed herein.

First, a second node 301 may receive a radio measurement from a wireless device 101 (message 16). The second node may thereafter store the radio measurement (operation 18). According to some of the example embodiments, the second node may be configured to maintain or store the received measurement as long as it satisfies a first positioning quality target. A first positioning quality target may be thought of as a threshold for determining if the received measurement should be, or still be stored. At least one example of a first positioning quality threshold may be an age of the measurement or how much time has elapsed since the measurement report was received by the second node.

Thereafter, the second node 301 may receive a positioning request from the first node 201 (message 20). In contrast to the prior art, the positioning request is a request for information related to a measurement which has already taken place, for example, a measurement which is already available.

Upon receiving the request, the second node 301 will determine if the radio measurement is still available (operation 22). According to some of the example embodiments, the determination further comprises obtaining at least one second quality target and verifying that the available measurement is also meeting the at least one second quality target. The at least one second quality target may also be thought of as a threshold to determine whether or not a measurement which was previously stored is still considered as available. According to some of the example embodiments, the second quality target may comprise any number of positioning quality target metrics, for example, related to time, accuracy and/or levels of the radio measurement.

Once a determination has been made as to whether the measurement is still available, the second node 301 will send a communication to the first node 201 and/or a third node 401 (message 24). The communication will comprise at least one of (1) at least one of the measurements determined to be available (and, in some embodiments, also meeting the at least one second quality target) or (2) an indication that at least one of the requested measurements was determined to be not available, or in some embodiments, not meeting the at least one second quality target.

According to some of the example embodiments, (1) and (2) may be comprised in the message if, for example, the measurement is available for one UE identified in the request (message 20) and not available for another UE, or the measurement of the first RAT is available and the measurement of the second RAT is not available when inter-RAT measurements are requested.

According to some of the example embodiments, if the received message comprises an indication that the requested measurement is not available, the second node 301 may send a measurement request to the wireless device 101 to obtain the requested measurement (message 26).

According to some of the example embodiments, if the received message comprises a measurement, the example embodiments may further comprise using the measurement for positioning or location-based services or other service exploiting the location knowledge (operation 28).

An example advantage of some of the example embodiments presented herein is the possibility to request and obtain the measurements that are available, without the need to configure the UE for the requested measurements. A further example advantage is improved positioning by using more measurements. Yet another example advantage is the exploitation of measurements for positioning that is already available to the network, without requesting the UE to perform new measurements. Another example advantage is a new procedure for requesting am measurement upon determining that the requested measurement is not available.

Different aspects of the example embodiments will be discussed according to the corresponding subheading. It should be appreciated that the example embodiments provided herein may be used in combination with one another. Specifically, embodiments described under one subheading may be combined with any other embodiments described under a different subheading.

Methods in a Node for Providing Available UE Measurements for Positioning Purposes According to some of the example embodiments, a second node, for example, a UE or eNodeB or RNC, and corresponding method therein, may comprise:

Step 1: (Optional) Receiving a UE measurement and maintaining, for example, store, it as long as it satisfies a first positioning quality target and making it available for a positioning request from a first node, for example, a network node such as a positioning node or another eNodeB, Step 2: Receiving a positioning request from the first node for at least one radio measurement from at least one UE, Step 3: Determine whether the requested at least one radio measurement is available, In some embodiments, determining further comprises obtaining at least one second quality target and verifying that the available measurement is also meeting the at least one second quality target Step 4: In response to the received request, send to a third node, which may or may not be the same as the first node, a message, wherein the message comprises at least one of, or both when, for example, the measurement is available for one UE and not available for another UE, or the measurement of the first RAT is available and the measurement of the second RAT is not available when inter-RAT measurements are requested:

at least one of the measurements determined to be available and, in some embodiments, also meeting the at least one second quality target or indication that all, some or at least one of the requested measurements was determined to be not available or, in some embodiments, not meeting the at least one second quality target.

Step 1

The second node receives at least one UE measurement and maintains it, for example, stores it, as long as it satisfies a first positioning quality target. Otherwise, the UE measurement may be discarded or maintained according to other or no rules, without respecting the quality target. The maintained UE measurements that potentially may be made available for positioning may be stored in a separate database; they may be stored for a period time corresponding to a quality target, for example, not longer than X seconds or minutes which may also depend on the UE speed.

Some examples of the first positioning quality target may be related to any one or more of:

Time, e.g., 'age' of the measurement, time elapsed since the measurement report was received, time elapsed since the measurement was performed or reported by the UE, time since the measurement was requested (for another purpose).

Measurement error or measurement quality, e.g., minimum required estimated measurement accuracy or precision.

Measurement value, e.g., minimum allowed RSRP, minimum allowed RSRQ, maximum allowed RTT, etc.

UE speed, e.g. longer storing/availability may be allowed for low-speed or stationary UEs Environment, e.g., longer storing/availability may be allowed for indoor UEs The maintained measurement may then be provided to the third node (Step 4).

Step 2

The second node receives a positioning request from the first node for at least one radio measurement from at least one UE. In one example, the request is the request for available measurements, for example, the second node receiving such request is not expected to request the measurements from the UE if they are not available.

According to some of the example embodiments, the request may comprise data indicating specific one or more UEs hereby requesting measurements, if available for these UEs.

According to some of the example embodiments, the request may be not UE-specific. In response to such a request the second node may provide in Step 4 the available measurements for one or more UEs, for which the measurements were determined to be available or meeting the quality target.

According to some of the example embodiments, the request may comprise one or more second quality targets to enable the second node to select among the available measurements to be reported in response to the request. For example, the request may indicate that only measurements received within the last X seconds or Y hours should be reported.

According to some of the example embodiments, the request may comprise a request for two or more measurement types, wherein the measurement types may be indicated in the request.

According to some of the example embodiments, the request may comprise an indication of at least one RAT for which the at least one UE measurement is to be provided. For example, the request indicates that GSM measurements are requested. In another example, the request indicates that UTRA measurements and GSM measurements are requested, where the requested measurement types for each specific RAT may also be indicated, for example, CPICH RSCP for UTRA.

According to some of the example embodiments, the request may comprise an indication of at least one frequency or band for which the at least one UE measurement is to be provided.

According to some of the example embodiments, the second node is eNodeB, the first node is a positioning node, for example, E-SMLC, and the request is received by the second node via LPPa. In one example, the request may be associated with E-CID. In another example, the request may be associated with RFPM.

Step 3

The second node determines whether the requested at least one radio measurement is available.

According to some of the example embodiments, the determining further comprises obtaining at least one second quality target and verifying that the available measurement is also meeting the at least one second quality target. The at least one second quality target may comprise one or more positioning quality target metrics, for example, time, accuracy, level, and/or specific quality target levels, for example, 1 hour, −100 dBm, −5 dB, etc. The at least one quality target may be obtained by the second in different ways, for example, may be pre-defined, for example, by the standard,
pre-configured, for example, hard-coded in eNodeB,
selected, for example, from a set of metrics or quality levels, or
received from another node, for example, from the second or a third node.

Some examples of the positioning target quality metrics are:

Time
Received signal strength
Received signal quality

A positioning target quality level may be absolute, for example, in time units such as seconds, dBm, Watt, etc., or relative with respect to a reference level, for example, in time units such as seconds or dB. The reference level may be determined by an event, for example, the time when the measurement was received by the first node or performed by the UE, or may be pre-defined, for example, by the standard, pre-configured, for example, in the first node, selected, for example, by the first node based on a quality selection criteria, or received from another node, for example, from the second node or the third node. In another example, the reference level may be received together with the measurement, for example, a timestamp included in the measurement report signaled by the UE.

According to some of the example embodiments, the step further comprises sending a request to the UE, if the requested measurement is not available or does not meet one or more of the second quality targets.

According to some of the example embodiments, the step further comprises waiting for the next, previously configured, periodically reported UE measurement, the periodicity may be quite sparse, for example, from 1 second and longer, if the previous measurement report was determined to be not available or not meeting one or more of the second quality targets.

Step 4

In response to the received request, the second node sends to a third node, which may or may not be the same as the first node, a message, wherein the message comprises at least one of, or both when, for example, the measurement is available for one UE and not available for another UE, or the measurement of the first RAT is available and the measurement of the second RAT is not available when inter-RAT measurements are requested:

at least one of the measurements determined to be available and, in some embodiments, also meeting the at least one second quality target, or indication that all, some or at least one of the requested measurements were determined to be not available or, in some embodiments, not meeting the at least one second quality target, or indication that all, some, or at least one UE is not capable of performing all, some, at least one, or one specific measurement, for example, an inter-RAT measurement for GSM.

The response may also comprise additional data, for example:

identities of UEs for which the measurements are provided, frequency/band/RAT indication for which the measurements are provided, measurement type for provided measurements, time indication associated with the provided measurements, which may be measurement-specific, for example, a timestamp for each measurement indicative of how 'old' the measurement is or the maximum 'age' of the reported measurements, UE location associated with the UE measurement, Cell ID of the cell associated with the UE measurement, for example, the serving cell of the UE or a neighbor cell on which the measurement was performed, Cell portion associated with the UE location during the UE measurement Methods in a Node for Retrieving Available UE Measurements for the Purpose of Positioning According to some of the example embodiments, a first node, for example, a network node such as a positioning node, and corresponding method therein, comprises:

Step 1: Sending a positioning request for an available UE measurement to a second node, for example, UE or eNodeB.

Step 2: Receiving a message in response to the positioning request, wherein the message comprises at least one of, or both when, for example, the measurement is available for one UE and not available for another UE, or the measurement of the first RAT is available and the measurement of the second RAT is not available when inter-RAT measurements are requested:

at least one of the measurements determined to be available and, in some embodiments, also meeting the at least one second quality target or indication that at least one of the requested measurements was determined to be not available or, in some embodiments, not meeting the at least one second quality target.

Step 3: If the received message comprises a measurement, using the measurement for positioning or location-based services or other service exploiting the location knowledge.

Step 1

The first node sends a positioning request for an available UE measurement to a second node. The second node receiving such request is not expected to request the measurements from the UE if they are not available but rather to provide what is available, if any.

In one embodiment, the request may further comprise one or more second quality targets to enable the second node to select among the available measurements to be reported in response to the request. For example, the request may indicate that only measurements received within the last X seconds or Y hours should be reported.

See Step 2 under the subheading 'Methods in a node for providing available UE measurements for the purpose of positioning' for more embodiments related to the request.

Step 2

Receiving a message in response to the positioning request, wherein the message comprises at least one of:

at least one of the measurements determined to be available (and, in some embodiments, also meeting the at least one second quality target), or indication that at least one of the requested measurements was determined to be not available or, in some embodiments, not meeting the at least one second quality target.

Both of the above may also be included in some embodiments, for example, when the measurement is available for one UE and not available for another UE and the request is for more than one UEs, or the measurement of the first RAT is available and the measurement of the second RAT is not available when inter-RAT measurements are requested.

See more details on other embodiments for the response message described in Step 4 under the subheading 'Methods in a node for providing available UE measurements for the purpose of positioning'.

Step 3

The third node receiving the UE measurements uses the received measurements for positioning or location-based services or other service exploiting the location knowledge, for example, doing one or more of:

Calculating a UE location for one or more specific UEs based on the received measurements, Using the measurements for location-based services (LBS), Storing at least one of the received measurements for using later for positioning of other UEs by matching the measurements of the other UEs with the stored measurements and the associated location, Using for updating RFPM measurement/prediction database, Using for updating AECID measurement/prediction database, Using for updating RF fingerprinting measurement/prediction database, Using the measurements for SON or RRM of the network.

Methods in a Network Node for Requesting UE Measurements that are not Available

According to some of the example embodiments, the second node upon receiving a request for UE measurements from the first node and determining that the requested measurements are not available, sends a measurement request to the UE to obtain the measurements requested by the first node.

According to some of the example embodiments, the request may be for an event-triggered measurement. According to some of the example embodiments, the request may be for a periodic measurement.

According to some of the example embodiments, the request is for inter-frequency or inter-RAT measurements.

According to some of the example embodiments, the request for the UE measurements are sent to the UEs selectively, e.g., is one or more conditions are met:

The serving cell quality or received signal strength is above a threshold,

The UE has a specific RAT, for example, LTE, as a serving RAT,

The UE does not require measurement gaps for performing the requested measurements, The UE has an on-going positioning session, The measurements on the serving carrier frequency/band/RAT are not available for the UE or do not meet one or more of the second quality targets or failed before, then inter-frequency/inter-band/inter-RAT measurements may be requested from the UE.

According to some of the example embodiments, the second node may also do one or more of:

if inter-frequency or inter-RAT measurements are requested from the second node, configuring measurement gaps for the UE to perform the requested measurements, if inter-frequency or inter-RAT measurements are requested from the second node, reconfiguring the existing measurement gaps for the UE to perform the requested measurements (e.g., when the gaps need to be aligned with the signals to be measured to enable the UE to perform the measurements), checking if the UE is capable of the requested measurements (e.g., inter-frequency or inter-RAT measurements or capable of performing measurements in the requested frequency/band/RAT) prior to requesting the inter-frequency or inter-RAT measurements (and send the request for UEs that are capable of such measurements and send an indication to the third node that the UE is not capable of the requested measurements otherwise)

checking the number of reporting criteria is not exceeded for the UE, if not exceed, request the measurements or otherwise respond to the third node that the measurements are not available and cannot be requested.

Upon receiving the requested measurements from the UE, the second node may send all, some or at least one of them to a third node, for example, see Step 4 under the subheading 'Methods in a node for proving available UE measurements for the purpose of positioning'.

Prior to sending the second node may also select among the received UE measurements the ones that meet the at least one second quality target, see the subheading 'Methods in a node for proving available UE measurements for the purpose of positioning', and send the selected UE measurements to the third node.

Example Node Configurations

Figure 3:
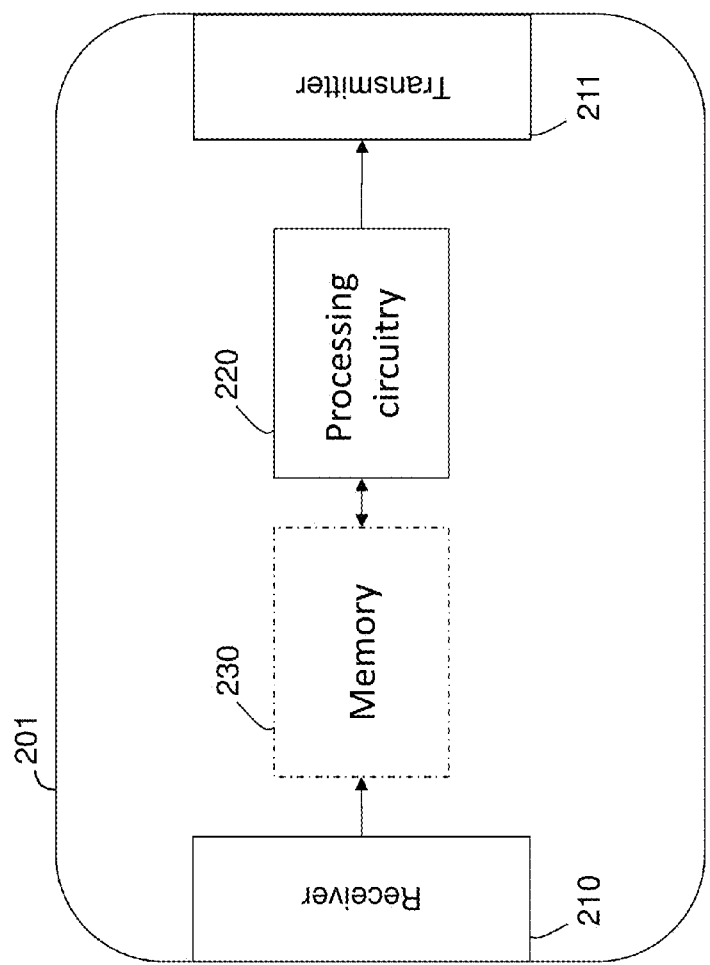
FIG. 3 is an example node configuration of a first node, according to some of the example embodiments presented herein.

FIG. 3 illustrates an example of a first node 201 which may incorporate some of the example embodiments discussed above. As shown in FIG. 3, the first node 201 may comprise a receiver 210 configured to receive and a transmitter 211 configured to transmit any form of communications, radio measurements, information associated with the radio measurements or control signals within a network. It should be appreciated that the receiver 210 and transmitter 211 may be comprised as any number of transceiving, receiving, and/or transmitting units, modules or circuitry. It should further be appreciated that the receiver 210 and transmitter 211 may be in the form of any input/output communications port known in the art. The receiver 210 and transmitter 211 may comprise RF circuitry and baseband processing circuitry (not shown).

The first node 201 may further comprise at least one memory unit or circuitry 230 that may be in communication with the radio circuitry 210. The memory 230 may be configured to store received or transmitted data and/or executable program instructions. The memory 230 may be any suitable type of computer readable memory and may be of volatile and/or non-volatile type.

The first node 201 may further comprise processing circuitry 220 which may be configured to prepare requests for available radio measurements as described herein. The processing circuitry 220 may be any suitable type of computation unit, e.g. a microprocessor, digital signal processor (DSP), field programmable gate array (FPGA), or application specific integrated circuit (ASIC) or any other form of circuitry or module. It should be appreciated that the processing circuitry need not be provided as a single unit but may be provided as any number of units or circuitry.

Figure 4:
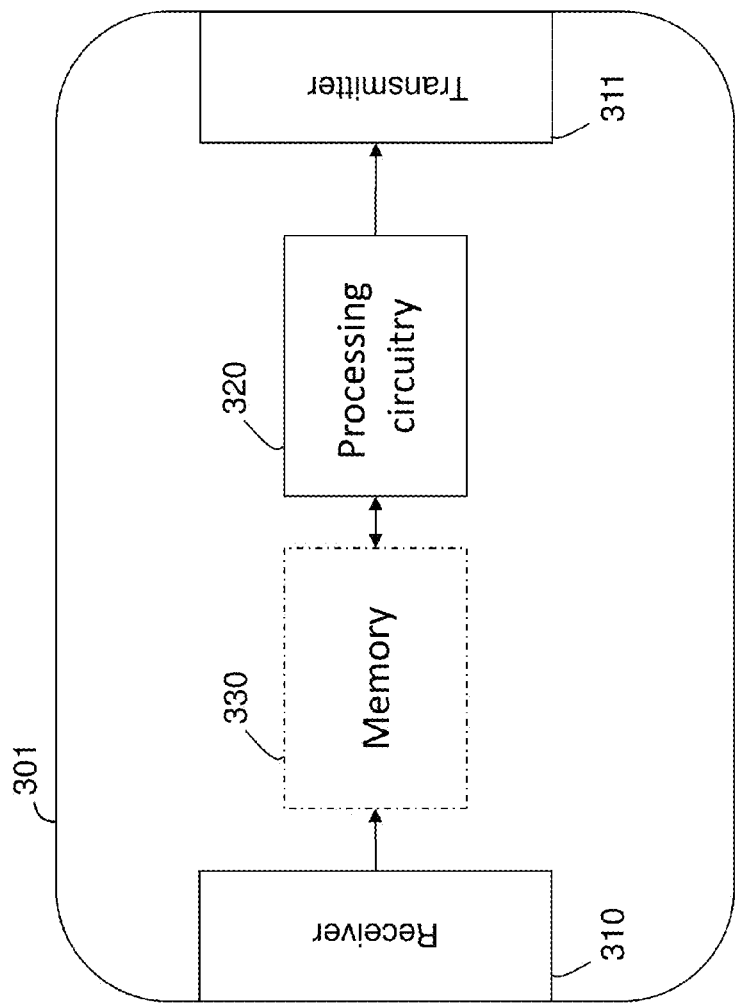
FIG. 4 is an example node configuration of a second node, according to some of the example embodiments presented herein.

FIG. 4 illustrates an example of a second node 301 which may incorporate some of the example embodiments discussed above. As shown in FIG. 4, the second node 301 may comprise a receiver 310 configured to receive and a transmitter 311 configured to transmit any form of communications, radio measurements, information associated with the radio measurements or control signals within a network. It should be appreciated that the receiver 310 and transmitter 311 may be comprised as any number of transceiving, receiving, and/or transmitting units, modules or circuitry. It should further be appreciated that the receiver 310 and transmitter 311 may be in the form of any input/output communications port known in the art. The receiver 310 and transmitter 311 may comprise RF circuitry and baseband processing circuitry (not shown).

The second node 301 may further comprise at least one memory unit or circuitry 330 that may be in communication with the radio circuitry 310. The memory 330 may be configured to store received or transmitted data and/or executable program instructions. The memory 330 may be any suitable type of computer readable memory and may be of volatile and/or non-volatile type.

The second node 301 may further comprise further comprises processing circuitry 320 which may be configured to analyze requests for available radio measurements as well as the availability of such measurements as described herein. The processing circuitry 320 may be any suitable type of computation unit, e.g. a microprocessor, digital signal processor (DSP), field programmable gate array (FPGA), or application specific integrated circuit (ASIC) or any other form of circuitry or module. It should be appreciated that the processing circuitry need not be provided as a single unit but may be provided as any number of units or circuitry.

Example Node Operations

Figure 5A:
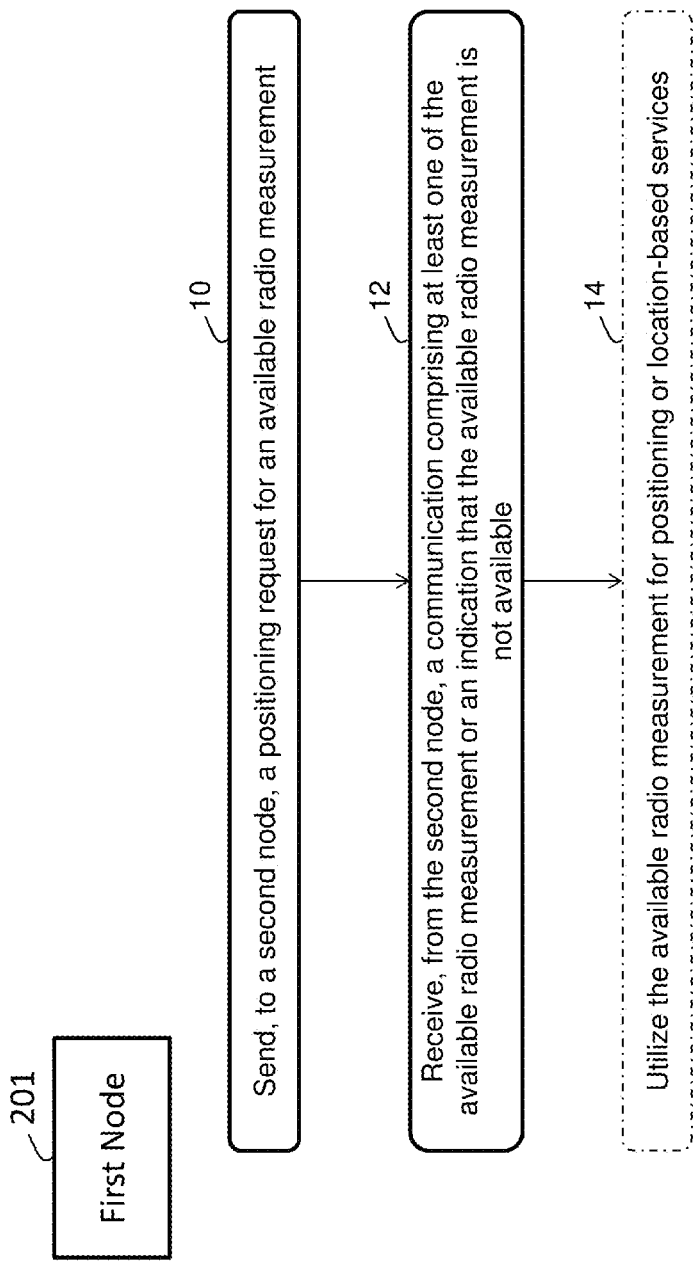
FIG. 5A is a flow diagram illustrating example operations which may be taken by the first node of FIG. 3, according to some of the example embodiments.

FIG. 5A is a flow diagram depicting example operations, which may be taken by the first node for obtaining an available radio measurement associated with a wireless device, as described herein. It should also be appreciated that FIG. 5A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

Figure 5B:
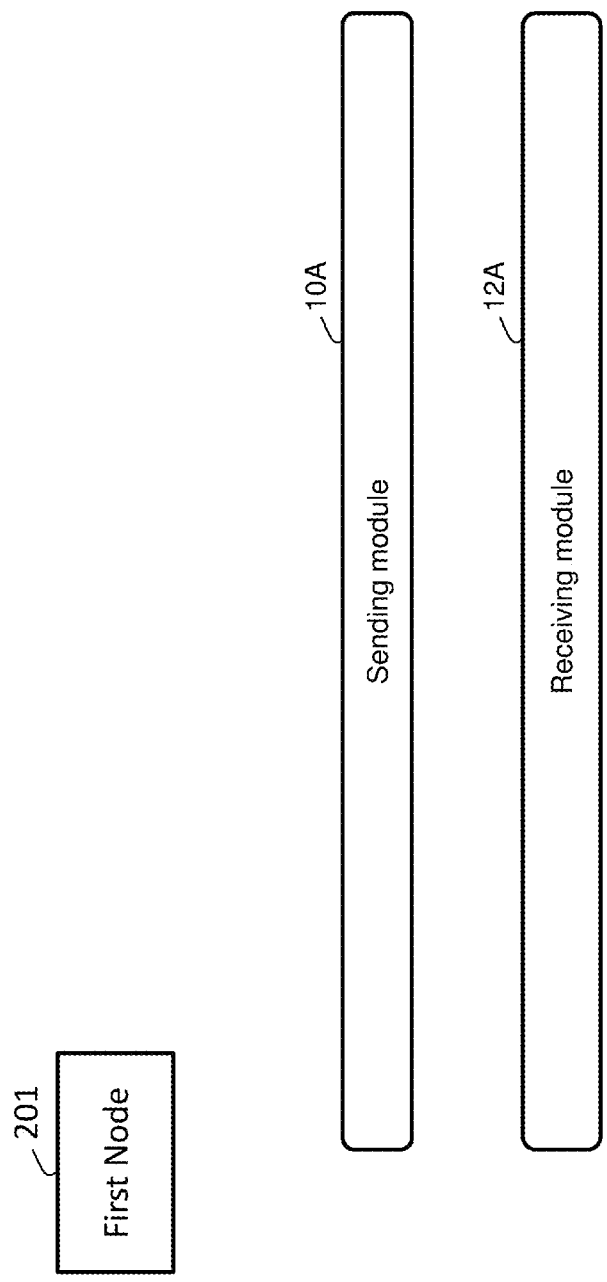
FIG. 5B is a module diagram illustrating modules configured to perform at least some of the operations illustrated in FIG. 5A.

FIG. 5B is a module diagram describing modules of the first node according to some of the example embodiments herein.

Operation 10

The first node 201 is configured to send 10, to a second node 301, a positioning request for the available radio measurement. The transmitter 211 is configured to send, to the second node, the positioning request. The sending module 10A is configured to perform operation 10.

At least one example of operation 10 is provided in FIG. 2, message 20, as well as the corresponding text. Thus, in contrast to current methods of retrieving radio measurements, the request is made for a radio measurement, which is already available or already present within the first node.

According to some of the example embodiments, the positioning request comprises at least one of data indicating at least one wireless device which obtained the available radio measurement, a time range in which the available radio measurement was taken, a measurement type of the available radio measurement, an indication of a radio access type in which the measurement was taken, and/or an indication of at least on frequency or band for which the available radio measurement was taken.

Operation 12

The first node 201 is further configured to receive 12, from the second node, a communication comprising at least one of the available radio measurement or an indication that the available radio measurement is not available. The receiver 210 is configured to receive, from the second node, the communication comprising at least one of the available radio measurement or the indication that the available radio measurement is not available. Receiving module 12A is configured to perform operation 12. At least one example of operation 12 is provided in FIG. 2, message 24, and the corresponding description.

It should be appreciated that if the communication comprises an indication that the available radio measurement is not available, the second node may send a measurement request to the wireless device as is depicted in FIG. 2, message 26.

According to some of the example embodiments, the communication further comprises at least one of an identity of at least one wireless device which obtained the available radio measurement, a measurement type of the available radio measurement, a time in which the available radio measurement was taken, a wireless device location associated with the available radio measurement, a cell identification of a cell associated with the available measurement, and/or a cell portion associated with the wireless device location when the available measurement was taken.

Example Operation 14

According to the example embodiments in which the communication comprises the available radio measurement, the first node is further configured to utilize 14 the available radio measurement for positioning or location-based services. The processing circuitry 220 is configured to utilize the available radio measurement for positioning or location-based services. At least one example of operation 12 is provided in FIG. 2, operation 28, and the corresponding description.

According to some of the example embodiments, the positioning or location-based services comprises at least one of calculating a wireless device location associated with the available radio measurement, storing the available radio measurement for later positioning of wireless devices, updating radio frequency pattern matching measurements and/or prediction databases, updating adaptive enhanced cell identification measurements and/or prediction databases, updating radio frequency measurements and/or prediction databases, and/or using the available radio measurements for radio resource management and/or self-organizing network.

Figure 6A:
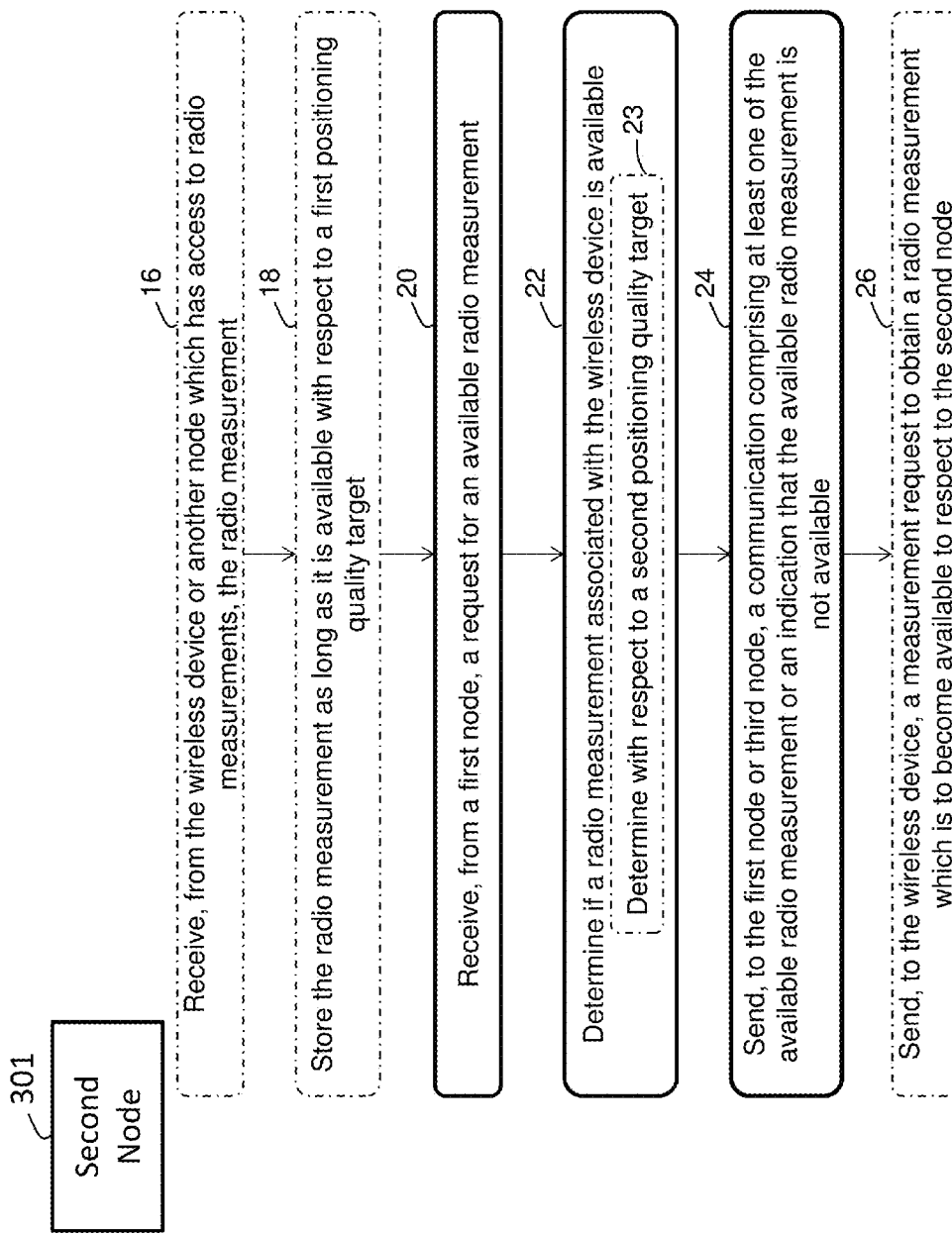
FIG. 6A is a flow diagram illustrating example operations which may be taken by the first node of FIG. 4, according to some of the example embodiments.

FIG. 6A is a flow diagram depicting example operations, which may be taken by the second node for providing an available radio measurement associated with a wireless device, as described herein. It should also be appreciated that FIG. 6A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

Figure 6B:
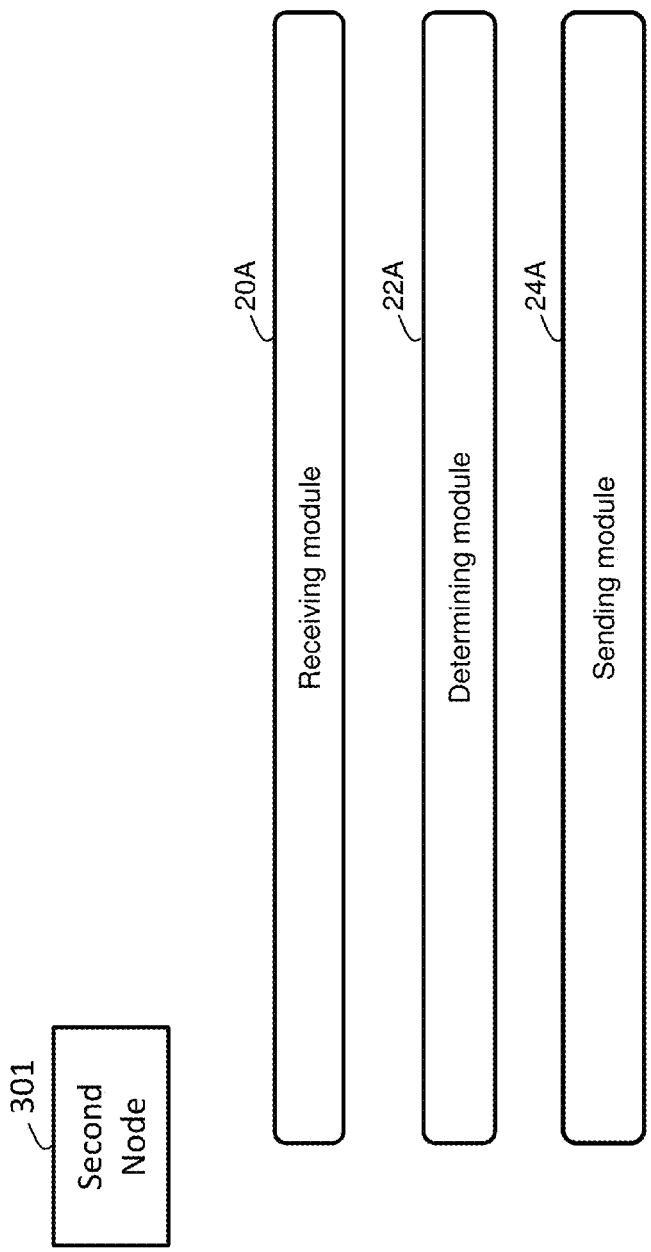
FIG. 6B is a module diagram illustrating modules configured to perform at least some of the operations illustrated in FIG. 6A.

FIG. 6B is a module diagram describing modules of the second node according to some of the example embodiments herein.

Example Operation 16

According to some of the example embodiments, the second node is configured to receive 16, from the wireless device or another node which has access to radio measurements, the radio measurement. The receiver 310 is configured to receive, from the wireless device or the other node, the radio measurement. At least one example of operation 16 is provided n FIG. 2, message 16.

Example Operation 18

According to some of the example embodiments, the receiving 16 may further comprise storing 18 the radio measurement as long as the radio measurement is available with respect to a first positioning quality target. The processing circuitry 320 is configured to store the radio measurement as long as the radio measurement is available with respect to the first positioning quality target.

According to some of the example embodiments, the first positioning quality target comprises at least one of an allowable amount of time elapsed since the available radio measurement was taken, a measurement a minimum required estimated measurement accuracy, a minimum or maximum allowed measurement value, a wireless device speed, and/or an environment.

Operation 20

The second node is configured to receive 20, from the first node, a positioning request for the available radio measurement. The receiver 310 is configured to receive, from the first node, the positioning request for the available radio measurement. The receiving module 20A is configured to perform operation 20. At least one example of operation 20 is provided in FIG. 2, message 20, as well as the corresponding text.

According to some of the example embodiments, the positioning request comprises at least one of data indicating at least one wireless device which obtained the available radio measurement, a time range in which the available radio measurement was taken, a measurement type of the available radio measurement, an indication of a radio access type in which the measurement was taken, and/or an indication of at least on frequency or band for which the available radio measurement was taken.

Operation 22

The second node is further configured to determine 22 if a radio measurement associated with the wireless device is available. The processing circuitry 320 is configured to determine if the radio measurement associated with the wireless device is available. The determining module 22A is configured to perform operation 22. At least one example of operation 22 is provided in FIG. 2, operation 22, and the corresponding text.

Example Operation 23

According to some of the example embodiments, the determining 22 further comprises determining 23 if the radio measurement associated with the wireless device is available with respect to a second positioning quality target. The second position quality comprises at least one of an allowable amount of time elapsed since the radio measurement was taken, an allowable level of received signal strength and/or an allowable level of received signal quality. The processing circuitry 320 is configured to determine 22 if the radio measurement associated with the wireless device is available with respect to a second positioning quality target.

Operation 24

The second node is further configured to send 24, to the first node or a third node, a communication comprising at least one of the available radio measurement or an indication that the radio measurement is not available. The transmitter 311 is configured to send, to the first node or the third node, the communication comprising at least one of the available radio measurement or the indication that the radio measurement is not available. The sending module 24A is configured to perform operation 24. At least one example of operation 24 is provided in FIG. 2, message 24, and the corresponding text.

It should be appreciated that if the communication comprises an indication that the available radio measurement is not available, the second node may send a measurement request to the wireless device as is depicted in FIG. 2, message 26.

According to some of the example embodiments, the communication further comprises at least one of an identity of at least one wireless device which obtained the available radio measurement, a measurement type of the available radio measurement, a time in which the available radio measurement was taken, a wireless device location associated with the available radio measurement, a cell identification of a cell associated with the available measurement, and/or a cell portion associated with the wireless device location when the available measurement was taken.

Example Operation 26

According to some of the example embodiments, if the radio measurement is no longer available, the second node is configured to send 26, to the wireless device, a measurement request to obtain a radio measurement which is to become available with respect to the second node. The transmitter 311 is configured to send, to the wireless device, the measurement request to obtain the radio measurement which is to become available with respect to the second node. At least one example of operation 26 is provided in FIG. 2, message 2, and the corresponding text.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a user equipment, as measuring or recording unit, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments.

Accordingly, although specific terms are employed, they are used in a generic and descriptive sense only and not for purposes of limitation.

The invention claimed is:

1. A method, in a first node, for obtaining an available radio measurement associated with a wireless device, the first node being comprised in a communications network, the method comprising:
   sending, to a second node, a positioning request for the available radio measurement, wherein the radio measurement is available when the radio measurement has already been taken and is being stored at the second node when the request is sent;
   receiving, from the second node, if the radio measurement is available, a communication comprising the available radio measurement and determining a location of the wireless device based on the available radio measurement; and
   receiving, from the second node, if the radio measurement is not available, an indication that the radio measurement is not available.

2. The method of claim 1, wherein the positioning request comprises at least one of: data indicating at least one wireless device which obtained the available radio measurement, a time range in which the available radio measurement was taken, a measurement type of the available radio measurement, an indication of a radio access type in which the measurement was taken, and an indication of at least one frequency or band for which the available radio measurement was taken.

3. The method of claim 1, wherein the communication further comprises at least one of: an identity of at least one wireless device which obtained the available radio measurement, a measurement type of the available radio measurement, a time in which the available radio measurement was taken, a wireless device location associated with the available radio measurement, a cell identification of a cell associated with the available measurement, and a cell portion associated with the wireless device location when the available measurement was taken.

4. The method of claim 1, wherein if the communication comprises the available radio measurement, the method further comprises utilizing the available radio measurement for positioning or location-based services.

5. The method of claim 4, wherein the positioning or location-based services comprise at least one of: calculating a wireless device location associated with the available radio measurement, storing the available radio measurement for later positioning of wireless devices, updating radio frequency pattern matching measurements and/or prediction databases, updating adaptive enhanced cell identification measurements and/or prediction databases, updating radio frequency measurements and/or prediction databases, and using the available radio measurements for radio resource management and/or self organizing network.

6. A first node for obtaining an available radio measurement associated with a wireless device, the first node being comprised in a communications network, the first node comprising:
   a transmitter configured to send, to a second node, a positioning request for the available radio measurement, wherein the radio measurement is available when the radio measurement has already been taken and is being stored at the second node when the request is sent;
   a receiver configured to receive, from the second node, if the radio measurement is available, a communication comprising the available radio measurement, and configured to receive, if the radio measurement is not available, an indication that the radio measurement is not available; and
   processing circuitry configured to, responsive to determining that the radio measurement is available, determine a location of the wireless device based on the available radio measurement.

7. The first node of claim 6, wherein the positioning request comprises at least one of: data indicating at least one wireless device which obtained the available radio measurement, a time range in which the available radio measurement was taken, a measurement type of the available radio measurement, an indication of a radio access type in which the measurement was taken, and an indication of at least one frequency or band for which the available radio measurement was taken.

8. The first node of claim 6, wherein the communication further comprises at least one of: an identity of at least one wireless device which obtained the available radio measurement, a measurement type of the available radio measurement, a time in which the available radio measurement was taken, a wireless device location associated with the available radio measurement, a cell identification of a cell associated with the available measurement, and a cell portion associated with the wireless device location when the available measurement was taken.

9. The first node of claim 6, wherein the processing circuitry is configured to utilize the available radio measurement for positioning or location-based services or any other service exploiting the location knowledge if the communication comprises the available radio measurement.

10. The first node of claim 9, wherein the positioning or location-based services comprise at least one of: calculating a wireless device location associated with the available radio measurement, storing the available radio measurement for later positioning of wireless devices, updating radio frequency pattern matching measurements and/or prediction databases, updating adaptive enhanced cell identification measurements and/or prediction databases, updating radio frequency measurements and/or prediction databases, and using the available radio measurements for radio resource management and/or self organizing network.

11. The first node of claim 6, wherein the first node is a network node, a eNB, a radio network controller, a location services node, and/or a positioning node, and wherein the second node is a eNB, a radio network controller, and/or a wireless device.

12. A method, in a second node, for providing an available radio measurement associated with a wireless device, the second node being comprised in a communications network, the method comprising:
   receiving, from a first node, a positioning request for the available radio measurement, wherein the radio measurement is available when the radio measurement has already been taken and is being stored at the second node when the request is received; and
   sending, to the first node or a third node, if the radio measurement is available, a communication comprising the available radio measurement, wherein the first node or the third node determines a location of the wireless device based on the available radio measurement; and
   sending, to the first node or the third node, if the radio measurement is not available, an indication that the radio measurement is not available.

13. The method of claim 12, wherein the positioning request comprises at least one of: data indicating at least one wireless device which obtained the available radio measurement, a time range in which the available radio measurement was taken, a measurement type of the available radio measurement, an indication of a radio access type in which the measurement was taken, and an indication of at least one frequency or band for which the available radio measurement was taken.

14. The method of claim 12, further comprising:
receiving, from the wireless device or another node which has access to radio measurements, the radio measurement; and
storing the radio measurement as long as the radio measurement is available with respect to a first positioning quality target.

15. The method of claim 14, wherein the first positioning quality target comprises at least one of: an allowable amount of time elapsed since the available radio measurement was taken, a measurement a minimum required estimated measurement accuracy, a minimum or maximum allowed measurement value, a wireless device speed, and an environment.

16. The method of claim 12, further comprising determining if the radio measurement associated with the wireless device is available with respect to a second positioning quality target, the second positioning quality target comprising at least one of: an allowable amount of time elapsed since the radio measurement was taken, an allowable level of received signal strength and an allowable level of received signal quality.

17. The method of claim 12, wherein if the radio measurement is no longer available, the method further comprises sending, to the wireless device, a measurement request to obtain a radio measurement which is to become available with respect to the second node.

18. The method of claim 12, wherein the communication further comprises at least one of: an identity of at least one wireless device which obtained the available radio measurement, a measurement type of the available radio measurement, a time in which the available radio measurement was taken, a wireless device location associated with the available radio measurement, a cell identification of a cell associated with the available measurement, and a cell portion associated with the wireless device location when the available measurement was taken.

19. A second node for providing an available radio measurement associated with a wireless device, the second node being comprised in a communications network, the second node comprising:
a receiver configured to receive, from a first node, a positioning request for the available radio measurement, wherein the radio measurement is available when the radio measurement has already been taken and is being stored at the second node when the request is received; and
a transmitter configured to send, to the first node or a third node, if the radio measurement is available, a communication comprising the available radio measurement, wherein the first node or the third node determines a location of the wireless device based on the available radio measurement,
wherein the transmitter is also configured to send, if the radio measurement is not available, an indication that the radio measurement is not available.

20. The second node of claim 19, wherein the positioning request comprises at least one of: data indicating at least one wireless device which obtained the available radio measurement, a time range in which the available radio measurement was taken, a measurement type of the available radio measurement, an indication of a radio access type in which the measurement was taken, and an indication of at least one frequency or band for which the available radio measurement was taken.

21. The second node of claim 19, wherein the receiver is further configured to receive the radio measurement from the wireless device or from another node that has access to radio measurements; and the processing circuitry is further configured to store the radio measurement as long as the radio measurement is available with respect to a first positioning quality target.

22. The second node of claim 21, wherein the first positioning quality target comprises at least one of: an allowable amount of time elapsed since the available radio measurement was taken, a measurement a minimum required estimated measurement accuracy, a minimum or maximum allowed measurement value, a wireless device speed, and an environment.

23. The second node of claim 19, wherein the processing circuitry is further configured to determine if the radio measurement associated with the wireless device is available with respect to a second positioning quality target, the second positioning quality target comprising at least one of: an allowable amount of time elapsed since the radio measurement was taken, an allowable level of received signal strength and an allowable level of received signal quality.

24. The second node of claim 19, wherein if the radio measurement is no longer available, the transmitter is further configured to send, to the wireless device, a measurement request to obtain a radio measurement which is to become available with respect to the second radio node.

25. The second node of claim 19, wherein the communication further comprises at least one of: an identity of at least one wireless device that obtained the available radio measurement, a measurement type of the available radio measurement, a time in which the available radio measurement was taken, a wireless device location associated with the available radio measurement, a cell identification of a cell associated with the available measurement, and a cell portion associated with the wireless device location when the available measurement was taken.

26. The second node of claim 19, wherein the first node is a network node, a eNB, a radio network controller, a location services node, and/or a positioning node, and wherein the second node is a eNB, a radio network controller, and/or a wireless device.

* * * * *

UNITED STATES PATENT AND TRADEMARK OFFICE
CERTIFICATE OF CORRECTION

PATENT NO.       : 9,756,602 B2
APPLICATION NO.  : 14/435967
DATED            : September 5, 2017
INVENTOR(S)      : Siomina It is certified that error appears in the above-identified patent and that said Letters Patent is hereby corrected as shown below:

On the Title Page

In Item (73), under "Assignee", in Column 1, Line 1, delete "Telefonatkiebolaget" and insert -- Telefonaktiebolaget --, therefor.

In Item (57), under "ABSTRACT", in Column 2, Line 6, delete "there," and insert -- therein, --, therefor.

In the Specification

In Column 1, Line 11, delete "there," and insert -- therein, --, therefor.

In Column 2, Line 28, delete "Type" and insert -- Technology --, therefor.

In Columns 5 & 6, Lines 14-15, delete "Assigned Critiality" and insert -- Assigned Criticality --, therefor.

In Column 9, Line 49, delete "herein" and insert -- herein; --, therefor.

In Column 11, Line 19, delete "Type" and insert -- Technology --, therefor.

In Column 12, Line 13, delete "node" and insert -- node: --, therefor.

In Column 13, Line 41, delete "of" and insert -- of: --, therefor.

In Column 14, Line 36, delete "target" and insert -- target, --, therefor.

In Column 15, Line 10, delete "UEs" and insert -- UEs. --, therefor.

In Column 15, Line 12, delete "UEs" and insert -- UEs. --, therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,756,602 B2

In Column 16, Line 7, delete "be" and insert -- be: --, therefor.

In Column 16, Line 18, delete "quality" and insert -- quality. --, therefor.

In Column 17, Line 14, delete "measurement" and insert -- measurement. --, therefor.

In Column 22, Line 37, delete "FIG. 2, message 20, as well as the corresponding text." and insert the same at Line 36, after "in" as a continuation paragraph.

In Column 23, Line 45, delete "herein" and insert -- herein. --, therefor.